United States Patent [19]
Wilson

[11] 3,724,694
[45] Apr. 3, 1973

[54] WHEEL-LESS TRAILER
[76] Inventor: Lynn E. Wilson, 724 Pine St., N., North Hudson, Wis. 54016
[22] Filed: Aug. 30, 1971
[21] Appl. No.: 175,972

[52] U.S. Cl..............................214/450, 224/42.07
[51] Int. Cl.................................................B06r 9/00
[58] Field of Search......214/450, 451, 452, 453, 454; 224/42.03 A, 42.03 B, 42.03 R, 42.07, 42.08, 42.43, 42.44, 29 R

[56] References Cited

UNITED STATES PATENTS

| | | | |
|---|---|---|---|
| 3,158,302 | 11/1964 | Dickerson | 224/42.43 |
| 3,348,713 | 10/1967 | Will | 214/450 |
| 3,650,443 | 3/1972 | Haskett | 224/42.07 |

*Primary Examiner*—Albert J. Makay
*Assistant Examiner*—John Mannix
*Attorney*—Allan O. Maki

[57] ABSTRACT

The invention relates to a load carrying attachment designed for mounting on the rear of a motor vehicle in a cantilevered fashion, supported at one point by a standard trailer hitch, preferably having ball hitch attachment and at points located underneath the vehicle preferably at opposite sides of the spring, there being a centrally pivotable load carrying platform which can be tilted to either side to permit loading and unloading of the device, there being a lateral supporting means affixed to the supporting frame and to points at opposite sides of the rear of the vehicle bumper, the opposite sides of the platform being releasably attached to the supporting means to permit tilting of the platform about the central pivot.

5 Claims, 5 Drawing Figures

LYNN E. WILSON
INVENTOR
Allan O. Maki
ATTORNEY

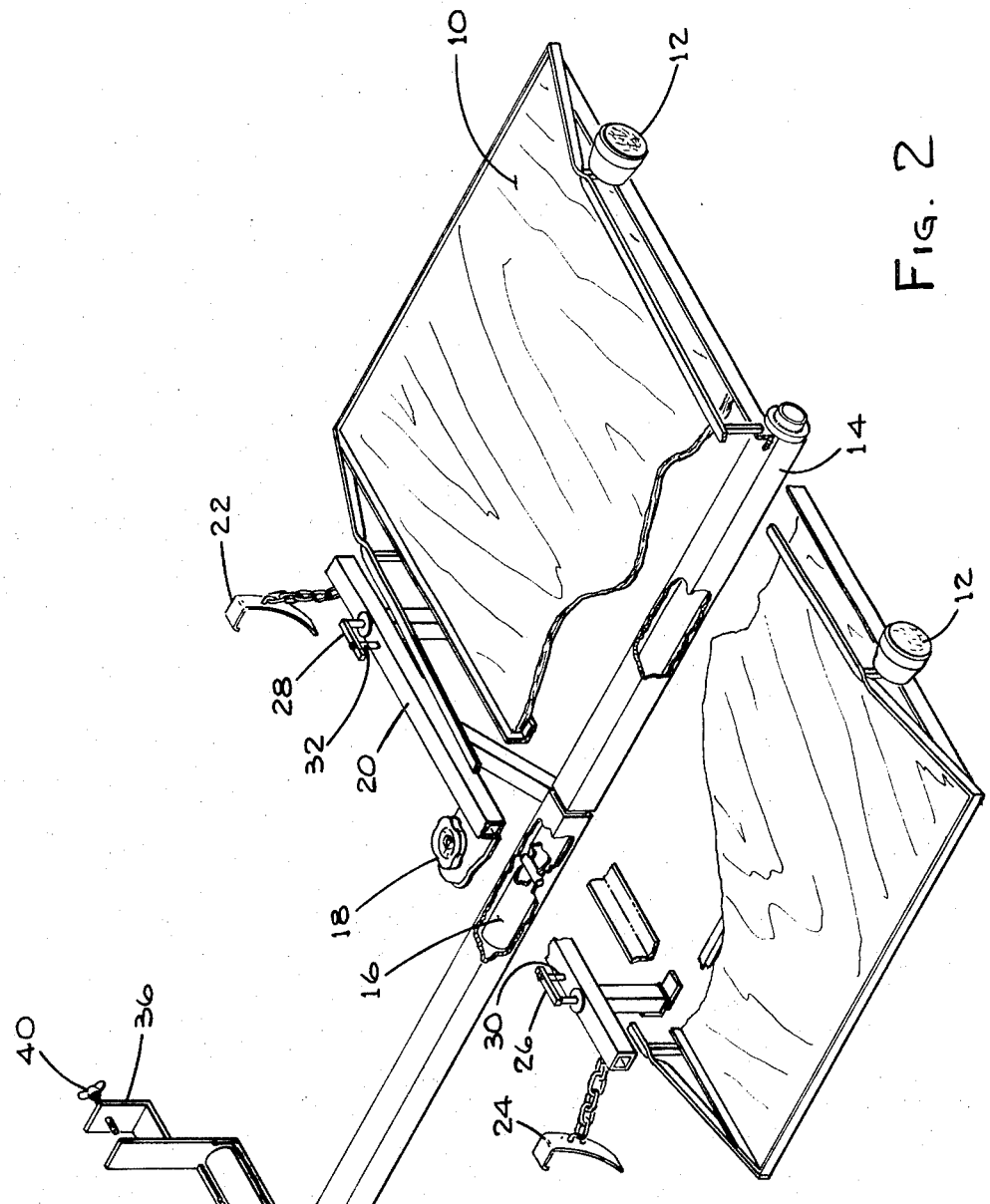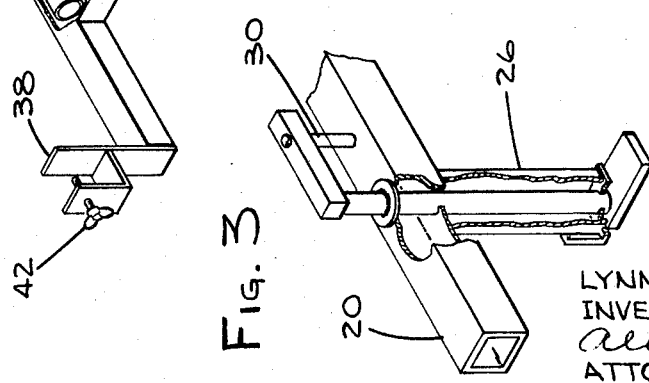

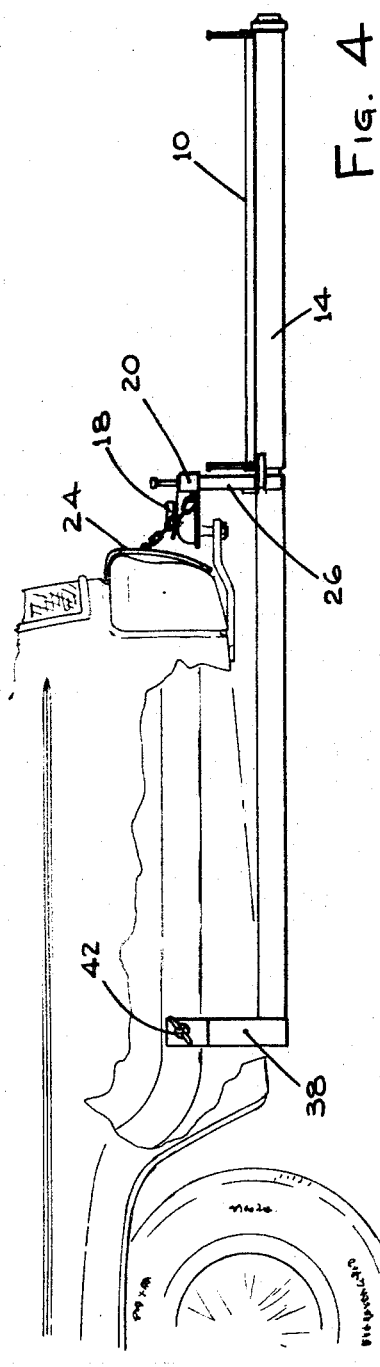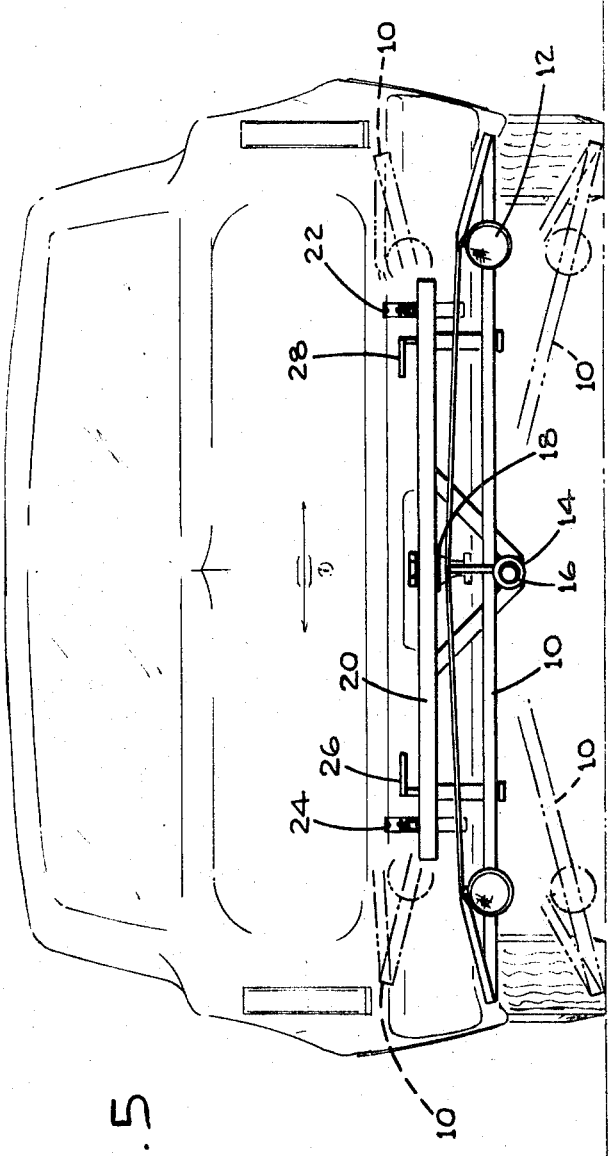

WHEEL-LESS TRAILER

This invention relates to a load carrying attachment for motor vehicles, more particularly to a platform adapted to be mounted in cantilevered fashion to the rear of a motor vehicle and being tiltable from side to side to permit loading and unloading of the platform.

Various means have been devised for providing load carrying attachments for motor vehicles, such as automobiles. These include top carriers, but where a heavy object, such as a riding lawn mower, snowmobile, motorcycle or the likes, is to be transported, the most common device has been a trailer provided with wheels which is towed behind the motor vehicle.

The present invention provides an improved load carrying attachment for motor vehicle which is in effect a wheel-less trailer adapted to be mounted on the rear of a motor vehicle. The present invention provides an economical means for increasing the load carrying capacity of a motor vehicle, particularly an automobile, because it does not require the expensive wheels and axle required by conventional trailers. The present invention utilizes a conventional trailer hitch to provide one mounting point and is further provided with adjustable means to be secured to the frame elements of a great variety of automobiles. A further advantage of the present invention is that the attachment is light weight and can easily be mounted to the rear of the motor vehicle by one individual in a few minutes. Another advantage of the attachment of this invention is the fact that additional weight is applied to the rear wheel of the motor vehicle providing added traction which is desirable in traveling through snow, mud and similar conditions. The invention further provides a device which can be tilted from side to side to permit easy loading and unloading of the device. The preferred mode of construction of the device provides remarkable strength and durability in spite of the very light weight thereof.

Other objects and advantages of the present invention will be readily apparent from the accompanying description and drawings wherein:

FIG. 2 is an isometric view of a platform with portions cut away to illustrate the internal construction of the attachment;

FIG. 3 is a fragmentary view with portions cut away illustrating a releasable attaching device for securing the forward edge of the platform to a lateral supporting means;

Figure 1:
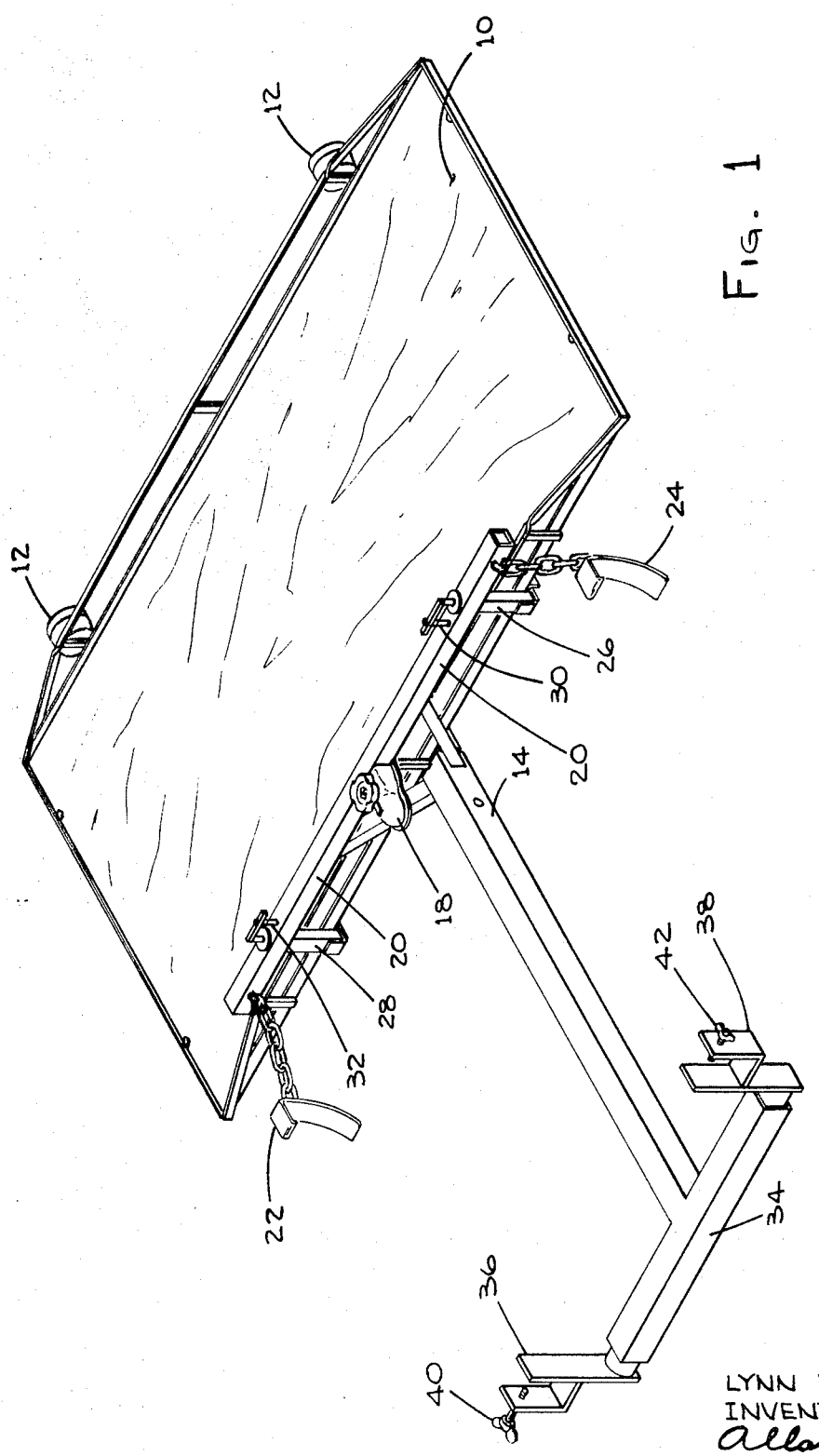
FIG. 1 is an isometric view illustrating a load supporting attachment of the present invention.

FIG. 4 is a fragmentary side view illustrating the attachment of the device of the present invention to a motor vehicle, portions of the motor vehicle being cut away, and FIG. 5 is an end elevational view showing the attachment of the present invention mounted on the rear of a motor vehicle and showing by means of partial dotted line views the tilting of the platform from side to side for purposes of loading an unloading thereof.

Referring more particularly to the drawings and FIG. 1, is shown a platform 10, having a load carrying surface constructed of plywood, sheetmetal, or the like, tail lights 12 are provided for safety purposes, a centrally located supporting arm means 14, which may be formed from square cross-sectioned steel tubing, is positioned beneath the platform, and the platform 10 is pivotably secured thereto, for example, by means of a tubular member 16, rigidly attached to the platform and extending into the hollow center of supporting arm 14.

Secured to the central supporting arm is means 18 devised to attach the forward edge of the platform to a trailer hitch mounted on the rear of the motor vehicle. This is preferably adapted for mounting on a ball hitch, but optionally a fastening device of the pin type could be used. Also interconnected with the central supporting arm and the trailer hitch attachment device are lateral supporting means 20. At opposite ends of lateral supporting means 20 are located fasteners 22 and 24, which may be clips, as illustrated, attached by means of chains to lateral supporting means 20. Fasteners 22 and 24 are adapted to be attached to opposite ends of a vehicle bumper. When attached, fasteners 22 and 24 hold the lateral supporting means 20 in a horizontal position.

The lateral supporting means 20 releasably supports the opposite sides of platform 10 by means of releasable clamps 26 and 28. In the position shown in the drawings, the clips 26 and 28 support the platform. The clips are prevented from turning by means of pins 30 and 32 which are positioned in holes drilled through the handle portion of clips 26 and 28 and into the member 20. Platform 10 can be tilted to the left by removing pin 30 and rotating clip 26 to permit the platform to drop. The load can then be driven up onto the platform which is then tilted back to a level position and clip 26 is again placed in the position shown in FIGS. 1 and 2. To unload the platform clip 28 is disengaged to permit the platform to tilt to the right as shown in FIG. 5.

In the preferred means for securing the forward portion to the underframe of a motor vehicle, a crossarm, 34 is interconnected or secured to the forward end of supporting arm 14. Means 36 and 38 are slidably positioned in the lateral means 34 for attachment of the device to an automobile frame. Means 36 and 38 can be extended laterally to the necessary extent to engage the frame elements of a wide variety of motor vehicles. Thumbscrews 40 and 42 or various other conventional attaching means may be used to secure the front of the device to the motor vehicle underbody. Preferably the means for attaching the device to the vehicle underbody is bifurcated as shown so that maximum stability of the unit is achieved.

The attachment of the invention can easily be attached to the rear of a motor vehicle simply by placing the hitching means 18 on a trailer hitch mounted on the motor vehicle and then securing means 36 and 38 to the underbody or frame of the motor vehicle. Clips 22 and 24 are then simply placed or clipped over the bumper of the motor vehicle. The platform may then be tilted for loading and unloading as previously described. A wide variety of loads such as snowmobiles, motorcycles, riding lawnmowers, and bulky solid articles may be transported by means of the attachment of this invention. Where the article being hauled has wheels it will be apparent that such article can easily be drawn on and off from the platform.

An optional method of permitting tilting of the platform is to construct the device so that supporting means 26 and 28 are stationary but the platform 10 is slidable to the rear to permit disengagement from the supporting devices. This may be accomplished, for example, by having means 16 threaded into a mating threaded device secured to element 14. A crank can then be provided to permit moving of the platform backward or forward. In such an embodiment when the platform is entirely forward it is held by means 26 and 28 and cannot tilt, whereas when it is moved backward it is free to tilt to either side.

While various illustrative embodiments of the invention have been shown in the drawings and described in detail herein, the invention is susceptible of embodiment in different forms. It is to be understood that the present exposure is an explification of the principles of the invention and is not intended to limit the invention to the particular embodiment illustrated. The scope of the invention will be pointed out in the appended claims.

What is claimed is:

1. A load carrying attachment adapted to be mounted on the rear of a motor vehicle comprising
   A. a load carrying platform pivotably supported by
   B. a centrally located supporting arm means extending from front to back of said platform upon which said platform can pivot,
   C. fastening means connected to said supporting arm means adapted to be attached to a trailer hitch mounted on the rear of said motor vehicle
   D. lateral supporting means connected to said fastening means and positioned forwardly of said platform
   E. releasable means located on both sides of fastening means (c) for securing the edges of said platform to said lateral supporting means
   F. means for attaching the opposite ends of said lateral supporting means to the rear of said motor vehicle
   G. mean connected to said means (c) and (d) extending forwardly of said platform and adapted to be attached to the underbody of said motor vehicle 2. A load carrying attachment according to claim 1 wherein the releasable means (e) are positive locking clamps which engage the forward edge of said platform.

3. A load carrying attachment according to claim 1 wherein the releasable means (e) are pins which engage apertures in the forward edge of said platform, said platform being slidable rearward off of said pins and forward onto said pins, and being provided with means to cause said platform to slide rearward and forward.

4. A load carrying attachment according to claim 1 wherein fastening means (c) is a ball engaging hitch.

5. A load carrying attachment according to claim 1 wherein means (g) is bifurcated and adapted to engage the frame on opposite sides of said motor vehicle.

* * * * *